G. BARTHOLOMAE.
Process for Fermenting Beer.
No. 201,982. Patented April 2, 1878.
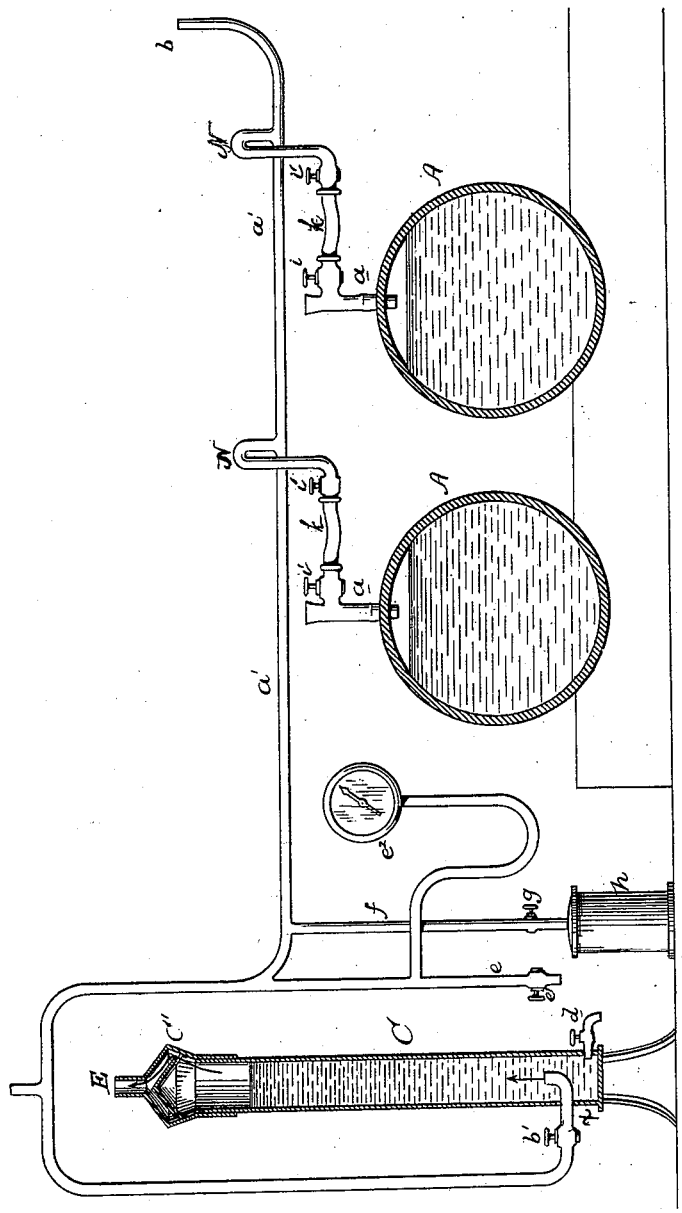
WITNESSES:
C. Clarence Poole
Jno. H. Evans
INVENTOR:
George Bartholomae
Per atty A. H. Evans & Co.

UNITED STATES PATENT OFFICE.

GEORGE BARTHOLOMAE, OF CHICAGO, ILLINOIS.

IMPROVEMENT IN PROCESSES FOR FERMENTING BEER.

Specification forming part of Letters Patent No. 201,982, dated April 2, 1878; application filed December 10, 1877.

*To all whom it may concern:*

Be it known that I, GEORGE BARTHOLOMAE, of Chicago, county of Cook, and State of Illinois, have invented certain new and useful Improvements in the Art of Making Beer; and I hereby declare the following to be a full, clear, and exact description thereof, reference being had to the accompanying drawing, making a part of this specification, in which the figure represents a vertical cross-section of my apparatus.

Heretofore, in brewing beer, after cooking and cooling, the beer is put into open vessels to ferment. The fermentation lasts, say, fifteen days, and then the beer is drawn off from the yeast into large casks, nearly closed, where it remains from one to six months to settle, and among the sediment there will still remain some yeast. The beer is then pumped into the "shavings-casks," and is mixed with young beer, (kraeusen,) which starts a mild refermentation, lasting from ten to fifteen days, until the generation of the gas is reduced to a minimum. During this fermentation the beer effervesces through means of the carbonic-acid gas rising, and the lighter particles are thrown to the top, forming a foam, which, during the ebullition, runs over the edges of the opening in the cask, and carrying along a small portion (more or less) of the beer, which is wasted, and this waste has to be replaced by refilling with new beer daily. This wastage I estimate, from practical experience in the manufacture, to be about one barrel in every forty, more or less. This waste beer, running down around the casks and on the floor of the cellars, sours and produces a mildew, which impregnates the air with foul vapors, highly injurious to the workmen, and permeating the beer in the casks, altering its flavor, and, in instances where the mildew penetrates the wood of the casks, spoiling the beer entirely. This fouling of the barrels requires that they should be washed outside from time to time, and the water used in this washing raises always the temperature of the cellar, and wastes the ice which is therein packed to keep the temperature about 41° Fahrenheit. After the beer has been in the shavings-casks from ten to fifteen days, the gelatine or other clarifying medium is introduced, and at the end of a couple of days the beer is entirely clear. The shavings-cask is then bunged up tightly for from three to five days, to confine the last portions of the rising carbonic-acid gas. This charges the beer with carbonic-acid gas, ($CO_2$,) so as to make it merchantable, and it must be drawn off at once into kegs and used; otherwise the pressure on the shavings-cask may burst it.

In selecting the time for drawing off the beer from the shavings-casks into the kegs to send it to market, the beer should never be under a pressure of over seven pounds to the square inch; otherwise the keg fills with foam in the drawing off, and the bubbles, subsiding, leave an air-space over the liquid beer, which absorbs a portion of the carbonic-acid gas, and soon leaves the beer in the keg flat. Arriving at the proper degree of pressure when to put the beer in kegs is, as the art is now practiced, merely a matter of judgment or guess by the foreman, and no two shavings-casks will be drawn off at precisely the same pressure, and the effervescing qualities of the beer will vary considerably, much to the detriment of the sales by the brewer.

If the beer is not put in market at once at this stage the bungs have to be removed from the casks and the gas allowed to escape. Then the escaping gas stirs up the yeast and impurities that have settled to the bottom, and the beer has to go through again the entire shavings-cask step in the process.

Under the processes now in use it requires about twenty days to put beer on the market after it is pumped into the shavings-casks. This delay requires brewers to keep a large amount of capital invested during the time in unfinished beer, and it is highly important to decrease this time of preparation.

The object of my invention is to overcome the difficulties above named, and also to produce in a shorter time a better beer, containing more sugar and less alcohol.

My invention consists in treating the beer, when in the shavings-cask step of the process of manufacture, in a series of closed casks under equalized automatically-controllable carbonic-acid-gas pressure, generated by the mild fermentation of the beer. This equalizes the pressure in all the casks, and the effervescing quality of the beer in all the casks is uniform.

The casks being closed, none of the beer wastes by running over, and the foul smells and washing of the casks and cellars are avoided. The escaping carbonic-acid gas is conducted from the relief-valve to the open air, and does not settle in the brewing-cellars to endanger life.

In order that those skilled in the art may make and use my invention, I will proceed to describe the manner in which I have carried it out.

In the said drawings, A A are shavings-casks, having faucets $a\ a$, provided with valves $i\ i$, inserted tightly in their bungs. These faucets are connected to taps N on the main pipe $a'$ by means of flexible sections $k$, provided with couplings. The taps or connections N have valves $i'\ i'$. Pipe $a'$ bends upward and passes above the level of a water-column, C, and then, passing downward, enters the base of the column at $x$, where it is provided with a cock, $b'$. The water column or vessel C has a faucet, $d$, to draw off water when desired to decrease the pressure. A depending branch pipe, $e$, and cock $c'$ serve to discharge any condensed moisture from pipe $a'$, and a pressure-gage, $e^2$, serves to indicate the pressure. By means of a gas-generator located at $h$, and connected to pipe $a'$ by means of pipe $f$, having cock $g$, I am enabled to test the joints of the apparatus and drive all atmospheric air from the pipes when the operation begins.

At the top of the water-column is a conical cap, terminating in a pipe, E, which is projected out of the building, and leads all the gas into the open air. Located within this cap is a conical diaphragm, C', centrally located, so that should the escape of the gas become so rapid as to lift the body of water upward, the water will be arrested by the diaphragm, while the gas escapes around its edges.

It is evident that the pressure in all the shavings-casks connected with pipe $a'$ will be equal, and be kept so indefinitely by means of the water-column, and as far as the enlivening of the beer is concerned, it is always ready for market, be it in ten days or four months, whereas in processes now practiced beer has to be "bunged" at a particular time for a particular day's market. My process enables the brewer to keep on hand merchantable beer which can be shipped instantly, or, if trade decreases, it enables him to keep his stock on hand without deterioration till the demand is made for it.

By using my apparatus I am enabled to clarify the beer and clear it of impurities in eight days, or less, whereas in the ordinary processes it takes from twelve to twenty days.

This immense gain in time I ascribe to the following action: The air being forced out of the pipes, the carbonic acid fills them and the space in the casks above the beer. Then the gas slowly accumulates in the space above the beer until the pressure above is such as to overcome the density of the beer and re-enter it, so as to charge it up to the pressure for which the column is set. This creates, in a manner, an equilibrium between the rising bubbles and the pressure above, during which gravity can act rapidly on the yeast and impurities in the beer, and carry them down among the shavings at the bottom of the cask, where they remain.

I introduce the clarifying gelatine into my shavings-casks after the beer is introduced, and before connecting with pipe $a'$, and actual practice has demonstrated to me that to clarify the beer by my process only requires about one-half of the gelatine heretofore used. This saving, together with the saving of the waste beer heretofore mentioned (one or more barrels in every forty) and the saving of labor, will greatly cheapen the production of beer.

When I desire to make beer for bottling, I attach my apparatus to the settling-casks, filled with beer, and no young beer (kraeusen) is added; but a little gelatine is added, and this remains for from fourteen to twenty days, until it becomes lively, and it is then bottled.

I find that bottled beer prepared this way is healthier, and will last in good condition two or three months, whereas the beer bottled now lasts only for eight or ten days, if pure and not steamed after bottling, the latter spoiling the aroma and flavor.

Having thus described my invention, what I claim as new, and desire to secure by Letters Patent, is—

1. The process of clarifying and settling beer in a series of shavings-casks, and equalizing the rate of fermentation in all of them, whereby the beer is more rapidly and thoroughly clarified, and will be ready for racking off in all the casks at the same time, and can be kept so, which consists in holding the beer in closed connected shavings-casks, under automatically-controlled low pressure of the generated carbonic-acid gas, substantially as described.

2. Casks A A, provided with cocks $a\ a$, flexible sections $k$, and taps N N, in combination with main pipe $a'$, water-column C, and pressure-gage $e^2$, all constructed, arranged, and operated as and for the purposes set forth.

GEORGE BARTHOLOMAE.

Witnesses:
FRED. W. WOLF,
L. LEBLE.